Dec. 30, 1947.  H. T. BOOTH  2,433,420
THERMOSTATIC CONTROL FOR LUBRICATION SYSTEMS
Filed July 29, 1942   11 Sheets-Sheet 1
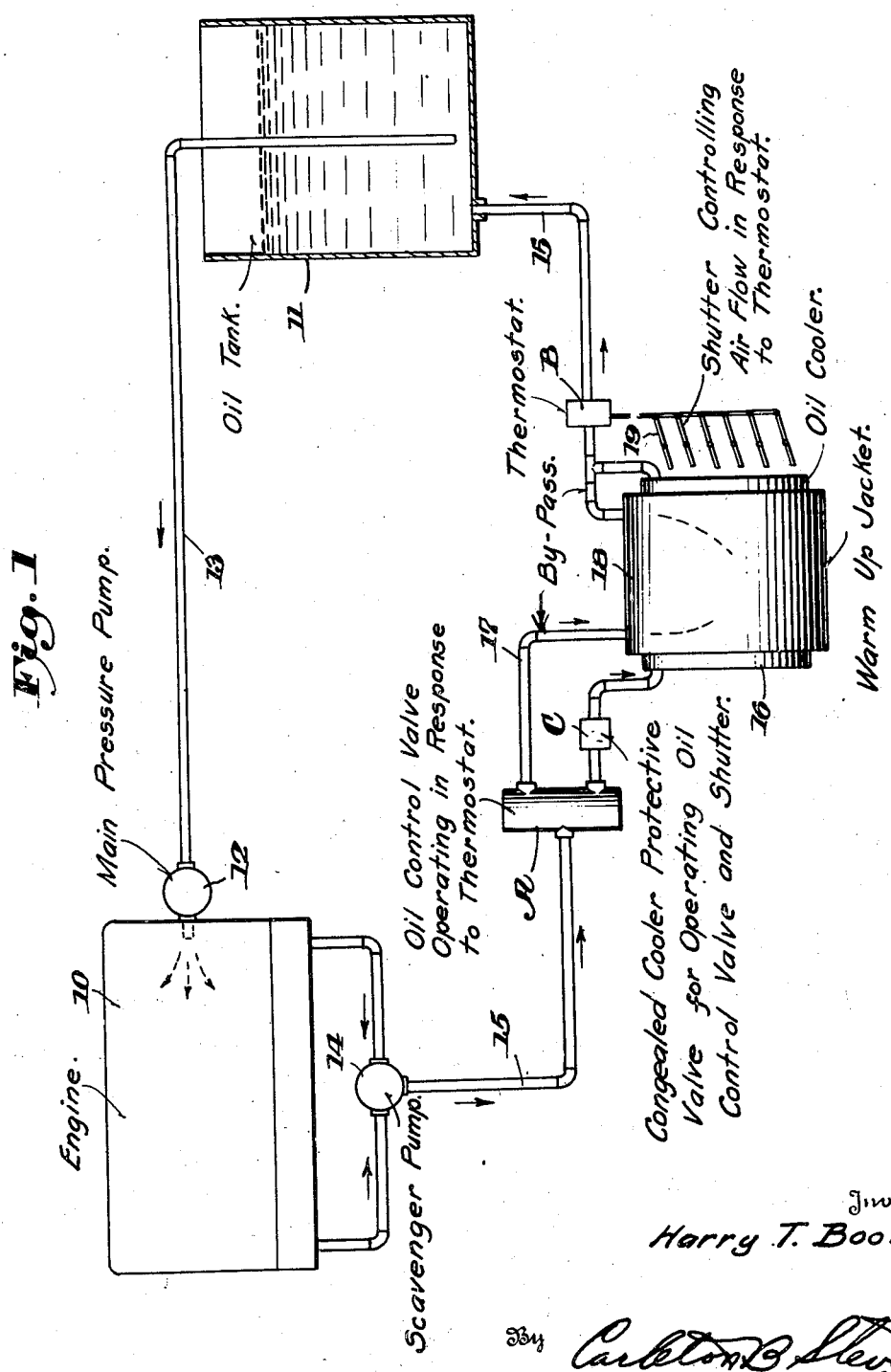

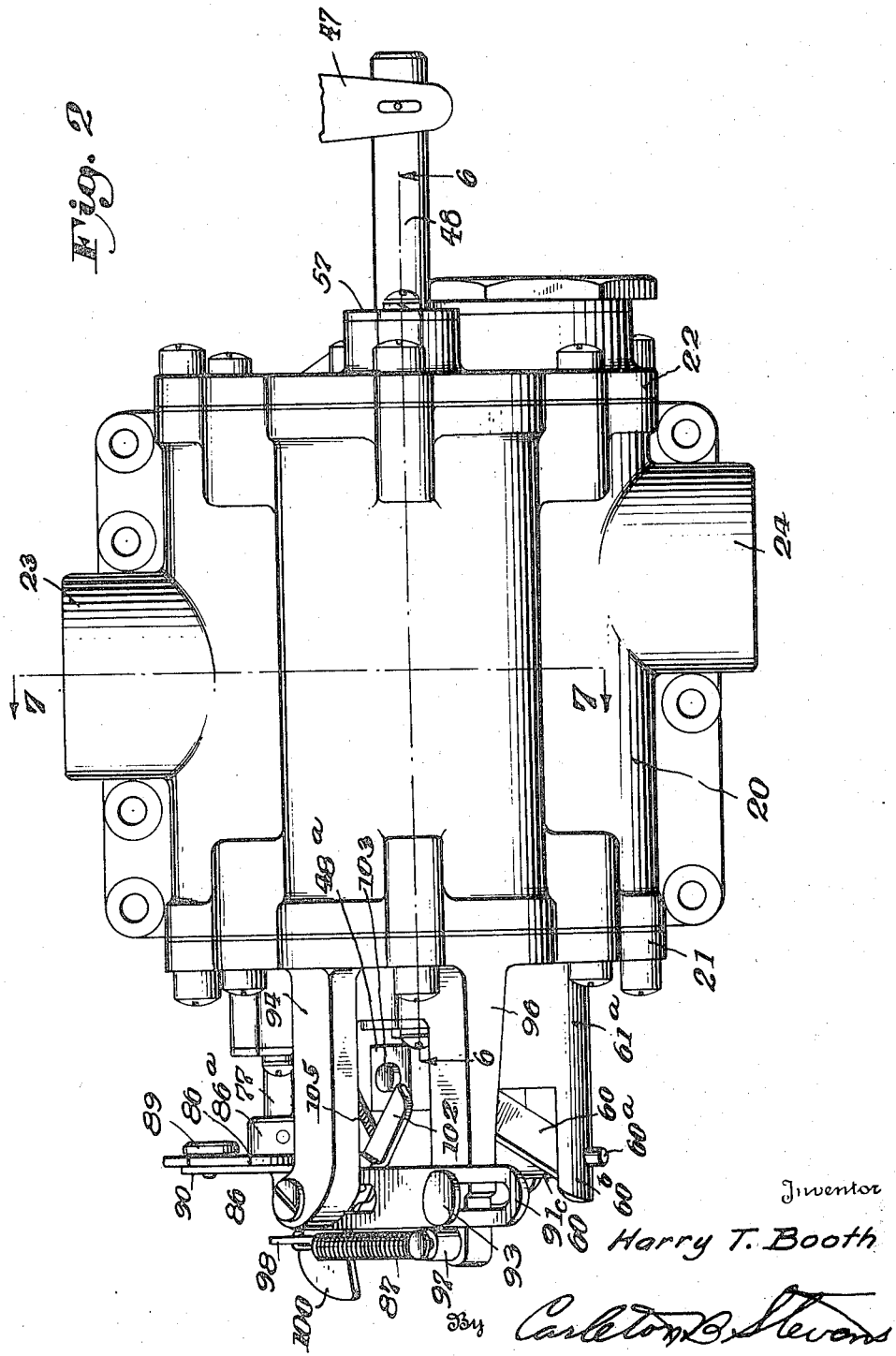

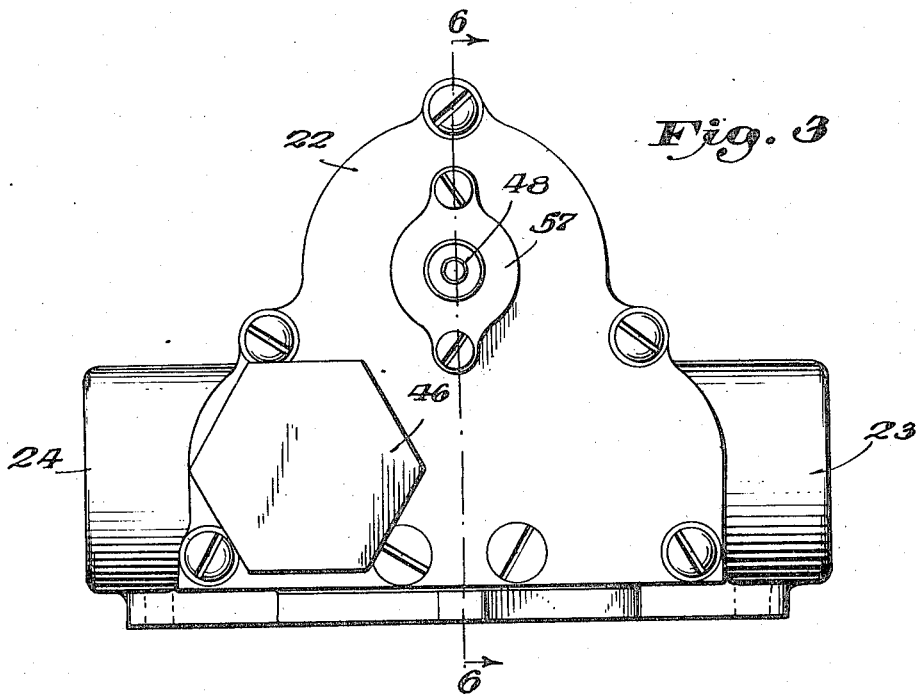
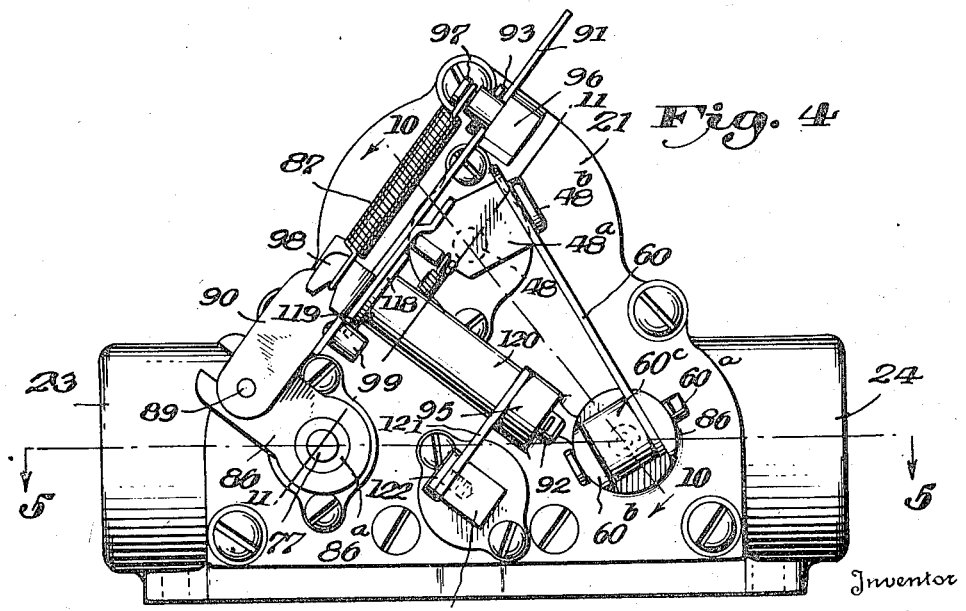

Dec. 30, 1947.                H. T. BOOTH                    2,433,420
            THERMOSTATIC CONTROL FOR LUBRICATION SYSTEMS
                 Filed July 29, 1942         11 Sheets-Sheet 4
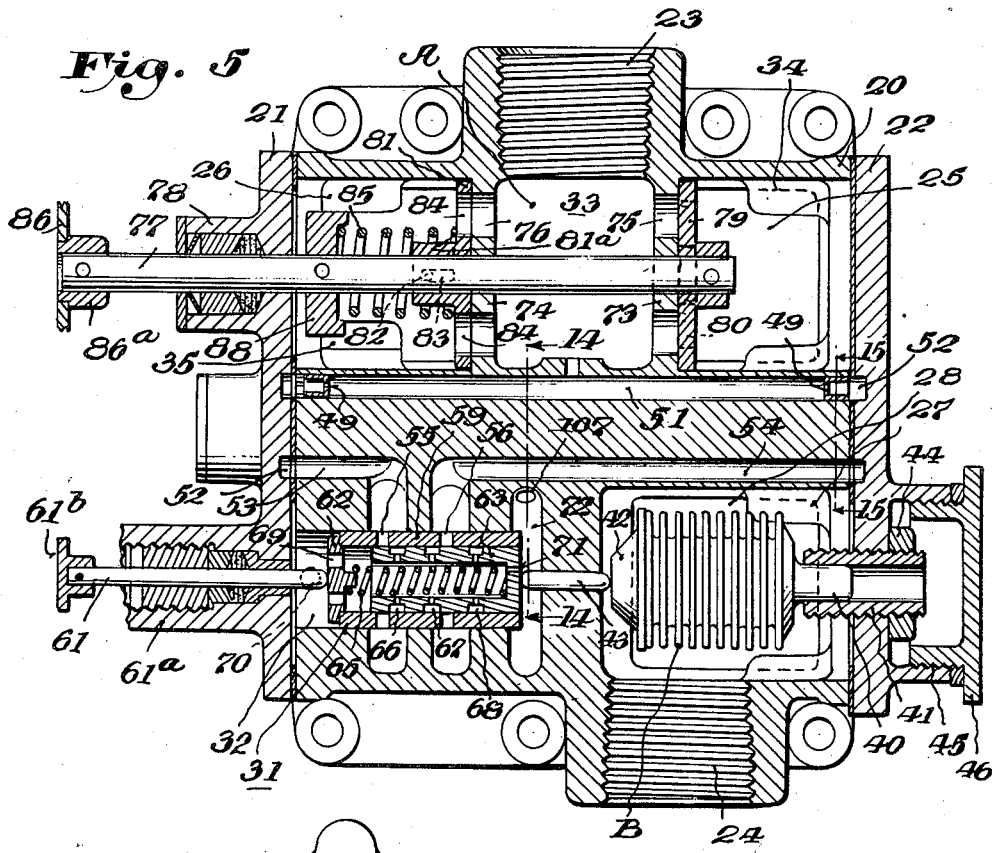
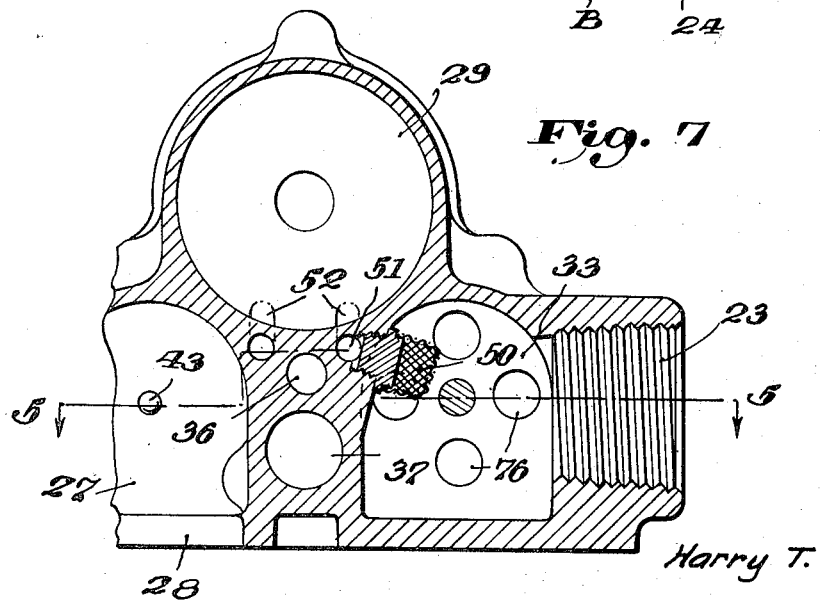
Inventor
Harry T. Booth,
By Carleton B. Stevens
Attorney Dec. 30, 1947.  H. T. BOOTH  2,433,420

THERMOSTATIC CONTROL FOR LUBRICATION SYSTEMS

Filed July 29, 1942  11 Sheets-Sheet 5

Inventor
Harry T. Booth,
By Carleton B. Stevens
Attorney

Dec. 30, 1947.  H. T. BOOTH  2,433,420
THERMOSTATIC CONTROL FOR LUBRICATION SYSTEMS
Filed July 29, 1942  11 Sheets-Sheet 6

Inventor
Harry T. Booth
By Carleton B. Stevens
Attorney

Dec. 30, 1947.    H. T. BOOTH    2,433,420
THERMOSTATIC CONTROL FOR LUBRICATION SYSTEMS
Filed July 29, 1942    11 Sheets-Sheet 7

Inventor
Harry T. Booth,
By Carleton B. Stevens
Attorney

Dec. 30, 1947. H. T. BOOTH 2,433,420
THERMOSTATIC CONTROL FOR LUBRICATION SYSTEMS
Filed July 29, 1942 11 Sheets-Sheet 8

Inventor
Harry T. Booth
By Carleton B. Stevens
Attorney

Dec. 30, 1947.  H. T. BOOTH  2,433,420
THERMOSTATIC CONTROL FOR LUBRICATION SYSTEMS
Filed July 29, 1942   11 Sheets-Sheet 9
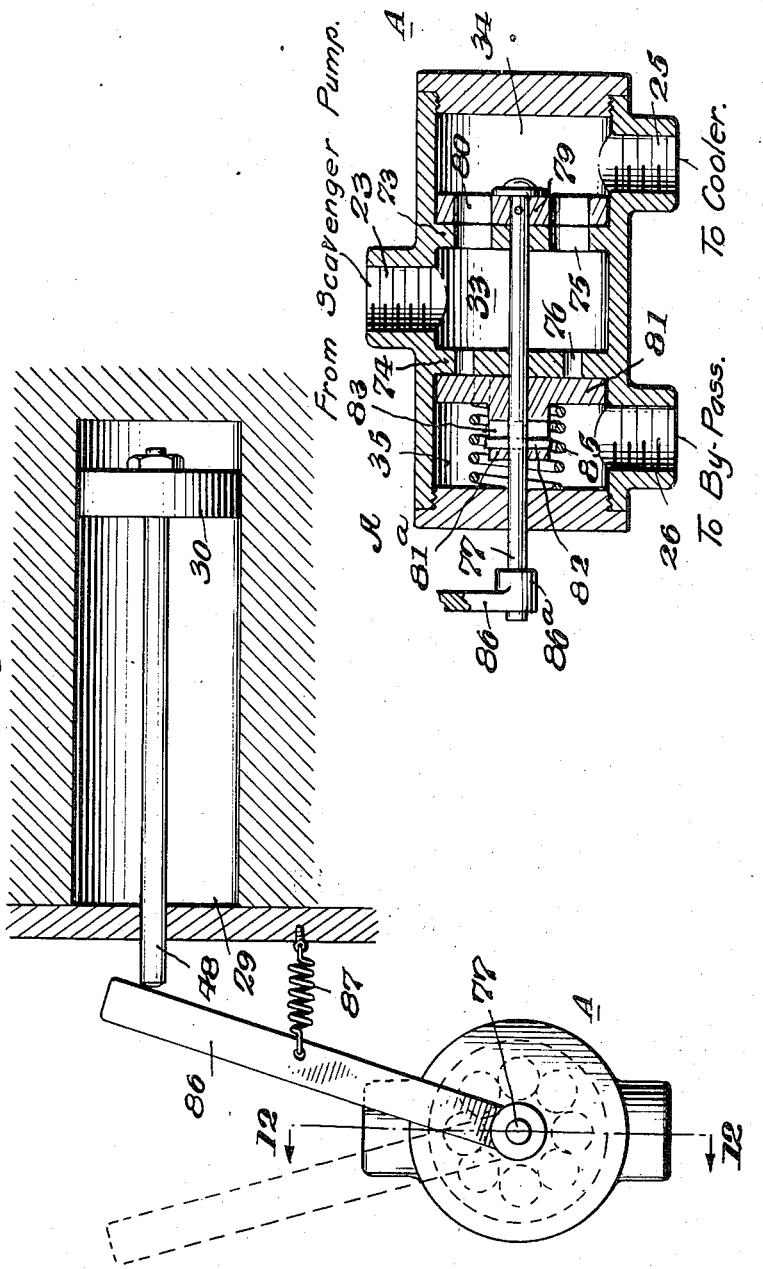
Inventor
Harry T. Booth,
By Carleton D. Stevens
Attorney Dec. 30, 1947.  H. T. BOOTH  2,433,420
THERMOSTATIC CONTROL FOR LUBRICATION SYSTEMS
Filed July 29, 1942  11 Sheets-Sheet 10

Inventor
Harry T. Booth,
By Carleton D. Stevens
Attorney

Patented Dec. 30, 1947

2,433,420

UNITED STATES PATENT OFFICE 2,433,420

THERMOSTATIC CONTROL FOR LUBRICATION SYSTEMS

Harry T. Booth, Glencoe, Ill., assignor to United Aircraft Products, Inc., Dayton, Ohio, a corporation of Ohio Application July 29, 1942, Serial No. 452,763

12 Claims. (Cl. 257—2)

1

This invention relates to thermostatic controls for lubrication systems and more particularly to oil circulating systems with coolers as employed in connection with airplane engines.

In airplane engine lubrication systems it has been the practice to employ a main pressure pump in the oil supply conduit leading from the oil tank to the engine for supplying the lubricating oil under pressure to the engine parts, and a scavenge pump for returning the oil through a return conduit to the oil tank.

This type of lubrication system is employed in substantially all modern aviation engines, and in those requiring cooling of the oil as it is returned, a cooler is inserted in the return line and the oil is forced therethrough under pressure by the scavenge pump, and, in such systems it is essential to provide some form of pressure relief to prevent bursting of the cooler or pipe lines due to congealing of the oil, as disclosed for example in the patent to Reuben G. Dykeman, No. 1,864,052, of June 21, 1932, Oil temperature regulator.

However, sudden changes in conditions, excessive speeds as in dive bombing and other airplane operations in accordance with present practices, the provision of such pressure reliefs in the cooling system is inadequate to take care of the abrupt changes, and even freezing of the oil. Therefore, the primary object of the present invention is to provide a thermostatic control of such oil circulating system with coolers.

Accordingly this invention resides in providing a thermostat in the oil return line beyond the cooler which operates in accordance with the temperature of the oil returned to the oil tank, and which operates to automatically control the temperature thereof by various fluid flow control valves, a cooler by-pass, and shutter as will be particularly defined hereinafter.

More particularly this invention resides in the combination of the thermostat and its control of the cooler shutter, and a by-pass valve through the instrumentality of a selector valve controlled by the thermostat for effecting a power operation of these members, and, also a congealed cooler protecting mechanism which functions independently of the thermostat but cooperates therewith in effecting the control of the return of the lubricating oil to the oil tank at the proper temperature.

Further objects and advantages of the invention will appear in the course of the following detailed description of the invention in conjunction with the accompanying drawings forming a part of this specification.

2

In the drawings:

Figure 1 is a diagram of an airplane engine lubrication system employing thermostatic controls in accordance with the present invention.

Figure 2 is a plan view of an assembled controller in accordance with this invention.

Figures 3 and 4 are respectively right and left end views of the controller illustrated in Figure 2.

Figure 5 is a sectional view taken substantially along the line 5—5 of Figures 4 and 7, parts being broken away and omitted.

Figure 7 is a fragmentary sectional view taken substantially along line 7—7 of Figure 2.

Figures 11 and 12 comprise similar diagrammatic illustrations of parts along a section 11—11 of Figure 4.

Figure 6:
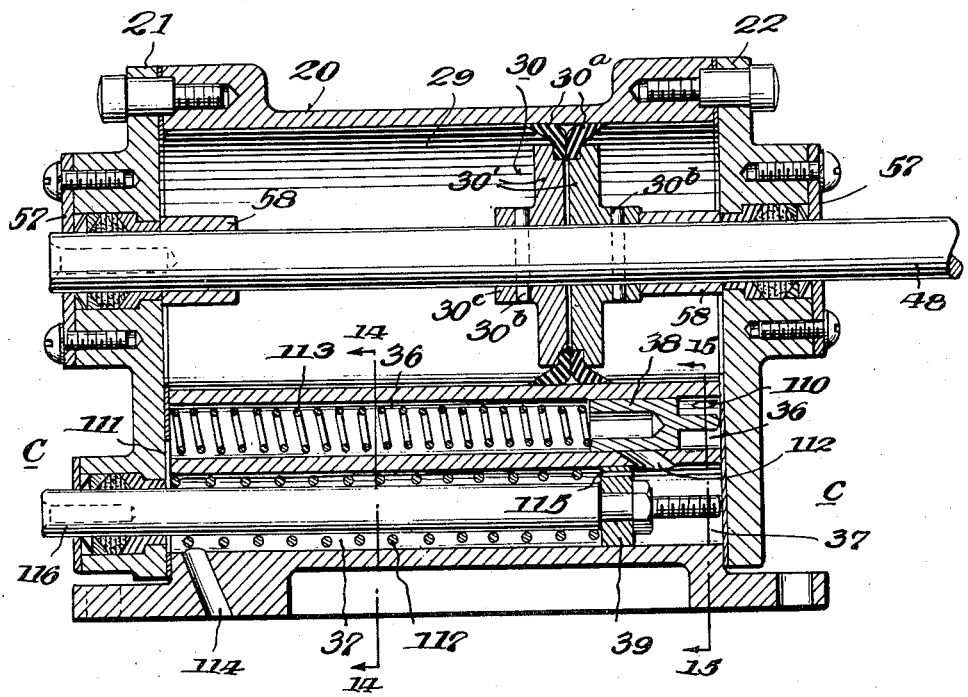
Figure 6 is a sectional view taken substantially along line 6—6 of Figures 2 and 3, parts being omitted.
Figure 13:
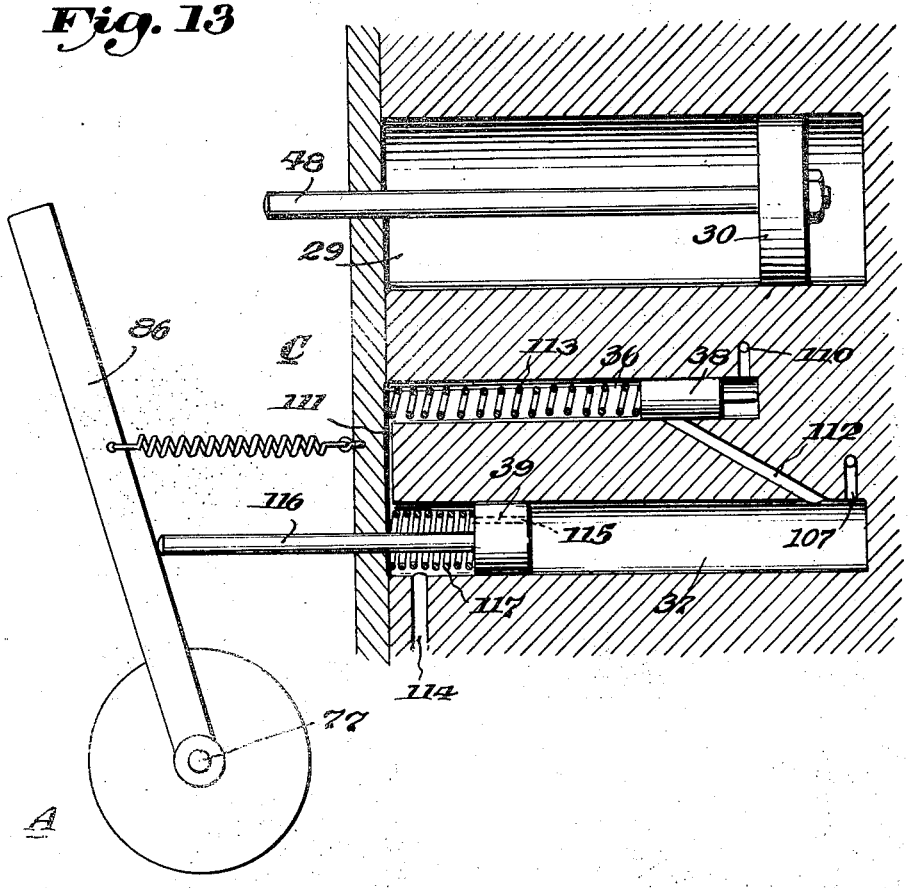

Figure 13 is a diagrammatic view illustrating parts along line 6—6 of Figures 2 and 3 similar to the sectional view of Figure 6 with slight modifications.

Figure 14:
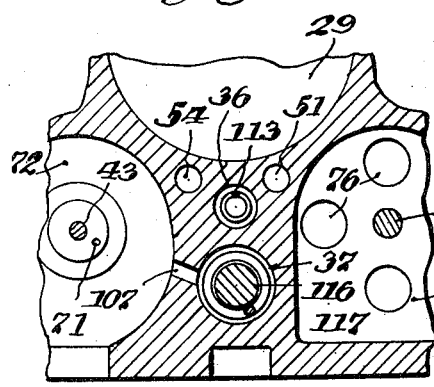

Figure 14 is a fragmentary sectional view taken substantially on line 14—14 of Figures 5 and 6.

Figure 15:
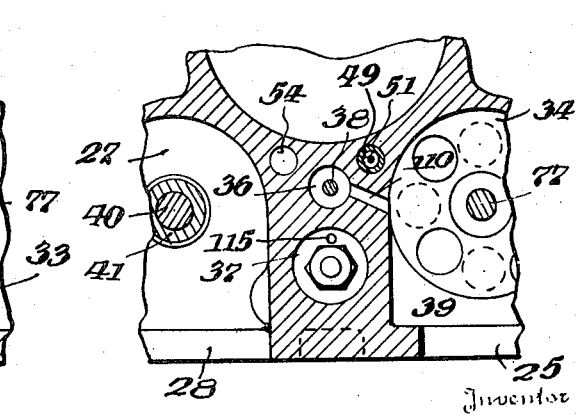

Figure 15 is a fragmentary sectional view taken substantially on line 15—15 of Figures 5 and 6.

Figure 16:
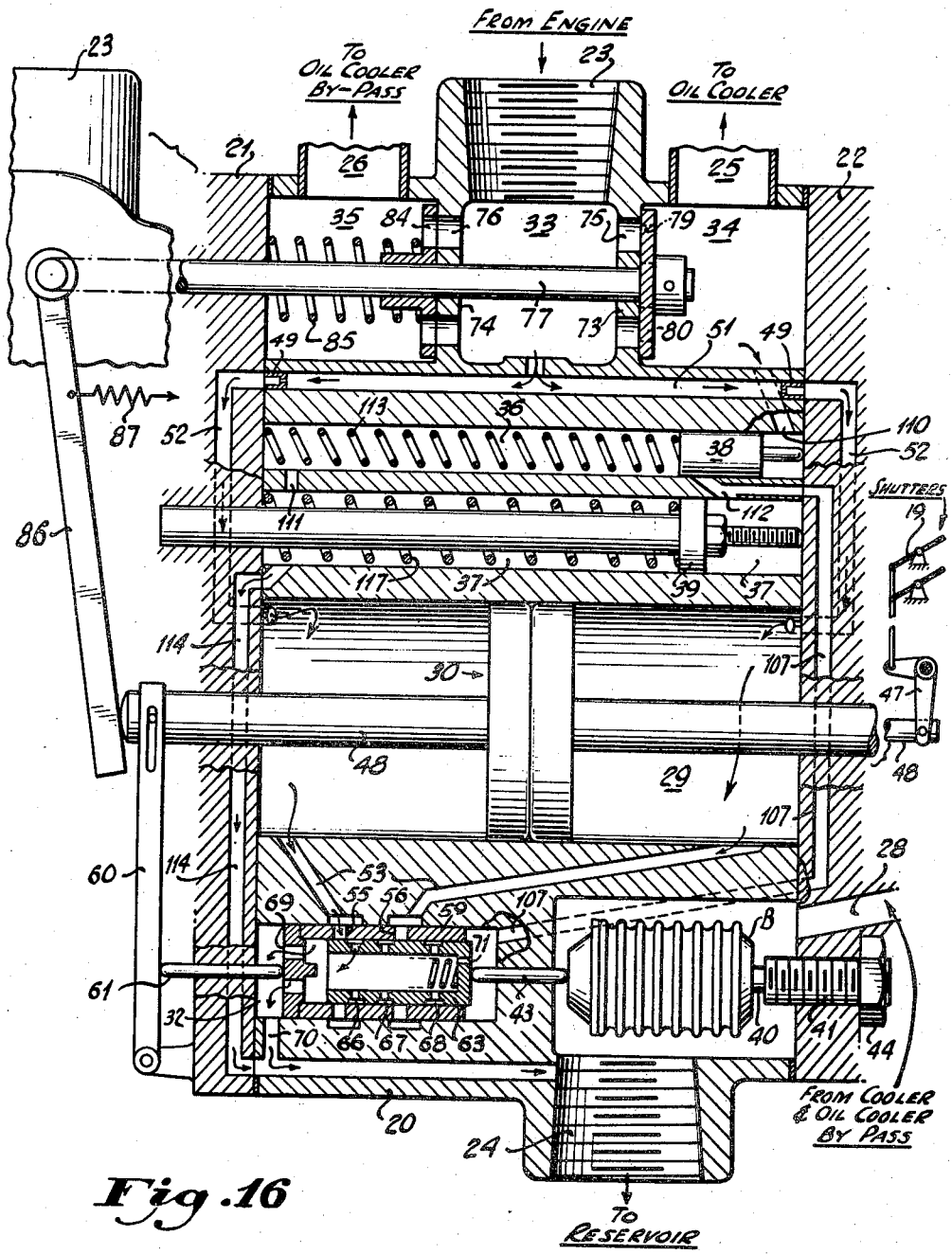

Figure 16 is a view showing in diagrammatic form the fluid operated parts and associated fluid ports and passages of the automatic control unit.

Referring to the drawings, the lubrication system in general, as shown in Figure 1, includes an engine 10, which receives oil drawn from an oil tank 11, by means of a main pressure pump 12, in the oil supply conduit 13, which pump forces the oil under pressure through the various parts of the engine. The oil then collects in the sump of the engine and is drawn therefrom by a scavenge pump 14 and returned under pressure through the return conduit 15 to the oil tank.

In accordance with the present invention, return conduit 15 includes an oil cooler 16; the oil being conducted first to a two-way oil control valve A, which either directs the oil through the cooler or through a by-pass conduit 17, including the passage through a warm-up jacket 18, for warming the cooler, or splits the flow so that part goes through the oil cooler and part through the by-pass and warm-up jacket depending on the temperature and conditions of the oil in the cooler. Control valve A is operated as hereinafter described by power operating mechanism controlled by a thermostat B. Thermostat B is connected in return conduit 15, beyond the heat transfer apparatus, cooler 16, and its warm-up jacket 18, in by-pass conduit 17, so that after leaving same the temperature of the oil is substantially that of the oil in oil tank 11, and as supplied to engine by the main pressure pump 12. Thus the thermostat B, actuating the power operating mechanism determines the flow of the oil to bring it to the required temperature for proper lubrication of the engine.

In regulating the temperature of the oil in its passage through the heat transfer apparatus, the thermostat B also, through the power operating mechanism controlled thereby, operates a shutter 19, for controlling the passage of air through oil cooler 16. The shutter is closed when the temperature is lower than the predetermined required value and is gradually opened as the temperature of the oil exceeds a given value until the shutter is wide open, when a predetermined temperature of the oil is reached.

Further the control for the lubrication system includes a cooler protective valve C, communicating directly with the inlet to oil cooler 16 and operates to prevent excessive pressure of the oil in the cooler when it is congealed. It also operates to close the shutter 19 under such conditions even though the temperature of the oil passing thermostat B exceeds the predetermined maximum temperature, as may occur during certain operations of the plane, as in dive bombing operations.

The controller

It is desirable that the several mechanical parts of the controller should be combined into one unit. Accordingly, referring to an assembled construction of a thermostatic controller illustrated in Figures 2 to 9, inclusive, and 14, 15 and 16, it will be seen that all the control parts referred to above are incorporated in a housing 20 such as a machined casting having cooperating end plates 21 and 22 secured thereto by bolts compressing sealing gaskets between them and the ends of this casting. This housing is provided with an internally threaded inlet 23 for connection with the conduit leading from the scavenge pump and a similarly internally threaded outlet 24 for connection with the conduit for returning the oil to the oil tank. As best shown in Figure 5, inlet 23 leads directly to the two-way control valve A, and communicating with said valve mechanism through base of housing 20, are ports 25 and 26, respectively for connection with a cooler and warm-up jacket as a by-pass of the cooler. Outlet 24, communicates with chamber 27, containing the control thermostat B, and this chamber has a port 28, through the base of the housing 20, for receiving the oil after it passes through the aforesaid heat exchange devices.

Housing 20, is provided with an enlarged piston cylinder 29 (best shown in Figures 6 and 7), in which a power operating piston 30, is adapted to be reciprocated for variably regulating the position of the cooler shutter 19, from open to closed position, and simultaneously operating the two-way control valve A (Figure 5) in response to thermostat B and controlled by the actuation of a selective control valve 31 (Figure 5). This selective control valve operates in a cylindrical valve chamber 32, extending coaxially with respect to thermostat B and is directly controlled thereby. In an intermediate position between the aligned thermostat and valve chambers 27 and 32 and aligned chambers 33, 34, and 35 for the two-way control valve A, as best shown in Figures 6 and 7, are longitudinal cylinders 36 and 37 for respectively a relief valve piston 38 and a piston 39 of the cooler protective relief valve C. Housing 20 is also formed with ports and conduits communicating with the various valve and operating cylinders and chambers for conducting fluid under pressure thereto by the scavenge pump, and the end members 21 and 22 are provided with mountings and guides for the operating elements and their interconnections as will be defined in connection with the following detail description of the various operating mechanisms.

Thermostat

Thermostat B, as shown in Figure 5 and which functions as the main control for the lubrication system, is of the bellows type containing fluid of such character that it develops a large increase of pressure as the temperature increases whereby its axial length increases after the temperature reaches a given point, and thence continues to increase as the temperature increases. Its increments of expansion and contraction are lineal with precision well within tolerance limits as required for the successful operation of an airplane engine lubricating system. Being positioned in a return passageway to the oil tank, in chamber 27, receiving the oil from the heat exchange apparatus (the cooler and/or the by-pass including the warmup jacket) as it enters through port 28, operates directly in response to the temperature of the oil being returned through the controller outlet 24, to the oil tank, and thence to the engine.

As shown, thermostat B, has an extended end member 40, which is secured in a threaded sleeve 41, adjustably received in a cooperating threaded mounting opening in end plate 22. This provides a mounting for the thermostat whereby it may be axially adjusted so that its opposite end 42, will operate on a push rod 43, in accordance with the oil temperature required. When the thermostat is adjusted to operate to produce required oil temperature, a lock nut 44, on sleeve 41, is set to maintain the adjustment. End plate 22 has an internally threaded collar 45, extending therefrom and surrounds this adjustable thermostat mounting, and a threaded cap 46 received therein provides a closure therefor which may be removed so that the thermostat may be adjusted when required from the exterior of housing 20.

Thermostat B, as stated, responds to the oil temperatures with accuracy but the increments and power of the variations of such a thermostat are insufficient to be utilized for operating the control devices. However, since the scavenge pump delivers the oil into the return conduit and this control equipment for the heat exchange apparatus under considerable pressure, which of course varies under varying operating conditions, such pressure on the oil afforded by the pump is utilized for operating the various actuating devices as controlled by the thermostat. Thus temperature changes acting on thermostat B, effect lineal movements acting on push rod 43, in accordance with the expansion and contraction of the thermostat, and such movements of rod 43 are translated directly to the selector valve 31 which functions in direct response to thermostat B for controlling the flow of fluid under pressure to operating cylinder 29 for the power operation of the cooler shutter and the two-way control valve A.

It is to be noted that the pressure in the thermostat chamber 27 should not be very great, since the thermostat motion depends on the difference in pressure between the inside and outside faces of the end cap 42. For normal operation, small variations in back pressure are immaterial.

The placing of thermostat A down stream from the cooler is a desirable feature, since it then is responsive to the temperature desired to be held constant and it is not subject to high pressures which occur at the cooler entrance.

Shutter control

In the temperature control of heat exchange systems, since the heat dissipation from a fluid may be controlled either by governing the rate of flow of the fluid through the cooler, or by the rate of flow of air through the cooler, or both, adjustment of the shutter for the coolers for controlling the air flow is desirable if not essential. From the pure heat transmission standpoint controlling either fluid in a heat exchanger is sufficient, but as applicable in lubrication systems, particularly for airplane engines, unless the air flow is controlled, congealing of the oil may occur, causing failure of the system. Thus if any one control may be utilized, it is preferable to control the air flow.

Figure 10:
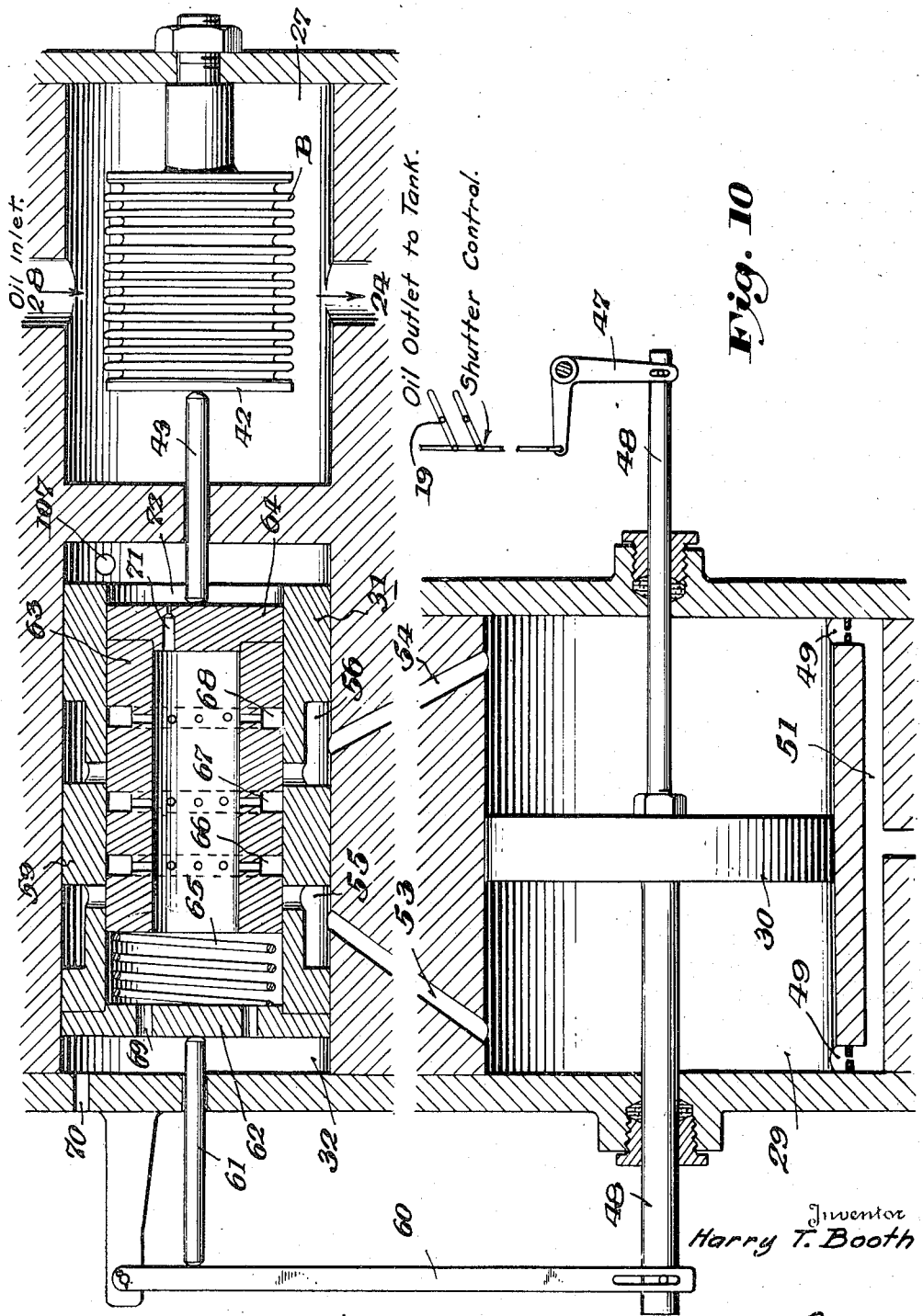
Figure 10 is a diagrammatic view illustrating parts along a section 10—10 of Figure 4 schematically and on an enlarged scale.

Accordingly, as shown in Figures 1 and 10, shutter 19, which may be positioned at either the inlet or preferably at the outlet of cooler 16, as shown is arranged to be adjusted for controlling the air flow. This shutter may be preferably of the Venetian blind type, the slats of the shutter being rotated to 90° to the air flow axis for complete restriction of the air and parallel to the axis for minimum restriction. This rotation is accomplished by means of a bell crank linkage 47 (Figure 10) connected to a piston shaft 48, on which piston 30, is mounted in operating cylinder 29. Movement of the shutter is effected by the movement of piston 30, in cylinder 29, in response to the flow of fluid and differences of the fluid pressures in cylinder 29 on opposite sides of the piston 30 as directly controlled by selector valve 31.

Operating cylinder

The operating cylinder 29, as disclosed in the diagram Figure 10, is provided with restricted inlet ports 49, at each end, fluid under pressure from the scavenge pump being supplied thereto from chamber 33, through a strainer 50, to conduit 51 (Figures 5 and 7): grooves 52, in the end plates 21 and 22 providing fluid inlets from conduit 51, and orifice restrictions 49, to opposite ends of cylinder 29, wherefrom the fluid may flow from groove outlets 52a to conduits 53 and 54, leading to ports 55, and 56, respectively in a piston 59 of selector valve 31.

It is desirable to screen the various parts of the controller which use only a small amount of oil. This is accomplished by means of the strainer 50 in the inlet of the controller which furnishes oil to selective valve 31 and operating cylinder 29. Other valves such as oil control valve A cannot easily be screened inasmuch as it is full flow and of such a character as to make sticking difficult, if not impossible.

Thus the oil under pressure is supplied to opposite ends of the operating cylinder 29, and by varying the pressures in cylinder 29, on the opposite sides of piston 30, by the flow of the fluid therefrom in response to operations of selective control valve 31, piston 30 is moved in the cylinder to vary the angle of the slats of shutters 19. If the pressure in the left end is reduced by allowing flow of oil from cylinder 29, through conduit 53, and port 55, of selector valve 31; port 56, being closed, pressure increases in the right end of cylinder 29, by the restricted flow of oil through orifice 49, in conduit 51, leading thereto, and piston 30, with its rod 48, moves to the left until port 55, of selector valve 31, is again closed. Movement of the piston to the right is similarly effected by opening of port 56, of selector valve 31, and the closing of port 55.

This change in the ratio of the pressure on the opposite side of piston 30, produced by outlet flow of fluid from one end or the other of cylinder 30, thus varies the movements of this piston and is effected in direct response to conditions of the selector valve 31, as controlled by thermostat B.

Referring particularly to Figure 6, it will be noted that in a satisfactory construction of this operating cylinder, piston 30, comprises cooperating disk elements 30', securing a suitable type of two-way piston rings 30a in cooperation with the wall of cylinder 29. Pins 30b, passing through collars 30c, retain the piston elements on piston shaft 48, which extends through both ends of cylinder 29, suitable shaft packing elements 57 being provided in end plates 21, and 22, as oil sealing means. The left end of this shaft 48, cooperates with operating elements, to be described, while the right end thereof is connected with linkage 47, for controlling the opening and closing of shutter 19, as indicated in Figure 10. Within cylinder 29, on shaft 48, are a pair of metallic sleeve elements 58, loosely mounted thereon, one at each end of the cylinder. These sleeves are limit stops for piston 30, at each end of its stroke and are of such an adjusted length to permit movement of shutter 19 in one direction so that its slats are wide open and in the other direction to rotate the slats through 90° to closed position. At the same time these stops are also control limits for operation of the elements actuated by shaft 48, of this operating cylinder at its other end. These sleeve elements 58 also limit the movements of piston 30 somewhat within the limits of corresponding movements of adjustments of thermostat B and corresponding movements of elements of the selector valve 30 at the ends of its stroke and thereby assure an application of power to piston 30 at the ends of its stroke as will be referred to hereinafter.

Selector valve

As described in connection with the shutter, or main operating cylinder, oil outlet ports 52, at opposite ends thereof communicate with ports 55, and 56, in a piston 59, of selector valve 31, by way of conduits 53, and 54, respectively, the communicating ends being enlarged longitudinally of cylinder 32 (Figure 5), so as to afford communication with these ports for all positions of the selector valve as determined by thermostat B.

The primary function of this selector valve is to follow the movements of thermostat B, and effect corresponding power movements of piston 30, of an increased magnitude under fluid pressure in the main operating cylinder by controlling the pressures on opposite sides of piston 30, thus allowing fluid flow from either one end or the other of cylinder 29, when such movements of the piston are required, as determined by variation in the expansion of the thermostat.

As more clearly illustrated in enlarged diagrammatic view Figure 10, selector valve 31, includes the cylindrical piston 59 which is adapted to be moved in cylinder 32 in accordance with movements of piston 30, by means of a lever 60, connected with piston shaft 48, in a manner so that a proportionate movement of piston 30, and its shaft 48, are transferred to a floating positioning pin or push rod 61. It is to be noted that the proportionate movement afforded by this lever and floating pin arrangement is exactly equal to the lineal expansion of thermostat B, when piston 30 is in a balanced position in operating cylinder 29, neglecting at this time any slippage due to load. Push rod 61 extending into selector valve cylinder 32 engages a cap 62, secured to the end of piston 59 and transfers the proportionate motion to this piston.

Inside piston 59, is another piston 63, as a cooperating element of the selector valve whose motion is controlled by push rod 43, one end of which push rod rests against cap 64, integrally secured to the end of piston 63 and the other end of which push rod rests against the free end 42, of thermostat B. Push rod 43 is supported in a close-fitting aperture through the wall from the end of cylinder 32 into the thermostat chamber 27. A spring 65 engaging between the two cooperating selector valve pistons 59 and 63 tends to separate outer piston 59, and inner piston 63 in a manner to maintain contact between the various elements, i. e., thermostat B, push rod 43, piston cap 64, piston 63, spring 65, piston cap 62, push rod 61, lever 60, and shutter piston shaft 48 (except for protective action hereinafter set forth).

As stated, high pressure oil is conducted through restricted passageways 49 to the ends of operating cylinder 29, and from these ends through conduits 53, and 54, to ports 55, and 56, respectively, in selector valve outer piston 59. As best shown in the enlarged diagram, Figure 10, the conduits are always in register with the ports by enlarged grooves in the piston, corresponding with the enlarged passages at the ends of conduits 53, and 54, surrounding selector valve 31, as shown in Figure 5.

Inner piston 63, has three outer grooves 66, 67, 68, through which ports are drilled to the inside of piston 63. Grooves 66, and 67, are so spaced that the distance between their outer edges is slightly less than the minimum distance between the sides of ports 55, and 56, in piston 59, and the distance between inner edges of grooves 66, and 67, is slightly greater than the diameter of port 55. Groove 68, is so located that when port 55 is covered by the piston cylinder wall between grooves 66, and 67, port 56 is open to groove 68.

Outer piston 59 has its cap 62 drilled to provide a plurality of apertures 69, to permit free passage of oil to an outlet 70, which communicates with fluid conduits conveying the lubricating oil, under substantially lower pressure, to the outlet mingling with the oil passing thermostat B.

Inner piston cap 64, has an orifice port 71, affording communication between the interior of piston 63, and a chamber 72, at the end of valve chamber 32 which permits a restricted flow therethrough as determined by the pressure differential across this orifice. Chamber 72 has a port 107, normally communicating with fluid conduits for conveying oil to and from the chamber as will be described in connection with the congealed cooler protector.

In the selector valve, the various elements above described in connection with the enlarged diagram, are shown in a similar form in actual construction as disclosed particularly in Figure 5, where the same reference numerals are employed to denote the various elements of the construction. However, the practical construction of linkage 60, for operating push rod 61, by operating cylinder shaft 48, is preferably of the construction shown in Figures 2, 4, 8 and 9. Accordingly shaft 48 is provided with a head 48a, having a stud 48b, which engages bifurcations in one end of lever 60. The other end of lever 60 is mounted on a pivot 60a, mounted in bifurcation 60b, extending from a shaft mounting and sealing housing 61a, formed to project from end plate 21, and through which push rod 61 projects. This end of lever 60 is provided with an eccentric cam element 60c, which swings with lever 60, and a follower 61b, on the end of push rod 61 in a manner to move push rod 61, in and out in accordance with the swinging movement of lever 60; the eccentricity of cam element 60c is such that the total movement of push rod 61, and piston 59, by the swing of lever 60, throughout a complete stroke, should be equal to the total lineal expansion of thermostat B, for normal operations of the control, neglecting slippage at this time. Accordingly the amount of the eccentricity of this cam is the factor of the multiplication factor of the movement of the piston 30 with respect to the lineal expansion of thermostat B. This ratio of movement of selector valve 31 to the movement of piston 30 may be otherwise varied, by changing the relationship of the levers, employing a thermostat having a greater or lesser degree of expansion, or otherwise amplifying the movement of the thermostat element.

In the operation of the selector valve 31, it will be noted that the walls of pistons 63, and 59, operate as slide valves. When thermostat B is heated so as to effect a movement of push rod 43 (to the left) piston 63 is moved therewith so that ports 55, and groove 66 are lined up. This permits oil to escape from the left end of operating cylinder 29, the outlet from the right end being blocked. Due to this flow of oil therefrom, the pressure in the left end of cylinder 29 is reduced and the greater pressure in the right end and flow of oil under pressure thereto through the inlet conduit restricted by its inlet orifice 49, piston 30 is moved to the left accordingly. As piston 30, and its shaft 48, are moved to the left, lever 60, and push rod 61, are moved permitting piston 59 to slide to the left. This motion continues until the port 55 closes, at which time the flow of oil from the left end of operating cylinder 29 is stopped and the pressures on the two sides of piston 30 are balanced and piston 30 is thus retained in the position in accordance with the position of the selector valve in its cylinder. When the oil temperature drops, thermostat B, contracts, and a similar reverse operation of selector valve 31, takes place, i. e., when thermostat B, contracts, push rod 43, and piston valve 63, follow it moving to the right so that groove 67, and port 56, are lined up and port 55 is blocked, thus allowing a flow of the oil from the right end of operating cylinder 29, and thereby increasing the pressure in the left end of the cylinder to move piston 30, and its shaft 48, to the right until push rod 61 moves outer piston 59, far enough to the left to again close port 56, at which time the oil flow ceases, and the pressures on opposite sides of piston 30 are equalized and piston 30, and its shaft 48, are maintained in the position corresponding with the position of the selector valve.

Thus it will be seen that the selector valve mechanism controls the fluid flow from the ends of operating cylinder 29, to determine the position of the operating cylinder piston 30, and its shaft 48. Operating cylinder 29, is of considerable diameter so that relatively small differences of pressure on opposite sides of piston 30, will perform with ample power for operating equipment, as may be required. Such differential pressures are variable according to the load and varying increments of movement of the selector valve piston members with respect to each other, but the maximum power of the operating cylinder is dependent upon ratio of the inlet to the outlet pressures. The speed of operation of pistons 30, is dependent upon the rate of flow through the inlet orifice at one end of the operating cylinder, and is affected by the rate of flow from the other end of the cylinder which is restricted accordingly to the effective orifice through the selector valve resulting from a movement of one of its piston valve elements with respect to the other. Therefore the maximum speed of operation of piston 30, is dependent primarily upon the size of the operating cylinder inlet orifice. Under normal operation, and the temperature control of thermostat B, the ratio of the inlet and variable outlet orifices is such as to afford a slow movement of piston 30; as the oil temperature increases, the rate of movement being limited by the restricted fluid outlet orifice in the selector valve due to a movement of one piston valve element with respect to the other as effected by a slight temperature change or slowly rising or falling temperature. When the selector valve is actuated so that a port in piston 59, is wide open into a groove in piston 63, as may occur in some instances, in a sudden variation of temperature of the oil, this provides a substantially unrestricted outlet for the oil from one end of operating cylinder 29, and a maximum piston speed movement is attained by the pressure in the opposite end, being limited only by the size of the inlet orifice.

In practice, owing to load, or varying loads on the piston in the operating cylinder, varying ratios of differential pressures on opposite sides of piston 30, may be required which results in a slippage requiring a relative displacement of the selector piston valve with respect to each other from their neutral or port-closing positions varying in magnitude in accordance with load changes. Therefore, since the inner piston 63, of the selector valve travels with the thermostat B, the outer piston 59 should travel slightly less, so that at the extremes there is sufficient area in the appropriate bleed to provide enough pressure differential to overcome any reasonable load that is applied by the shutter and/or other devices operated by the operating cylinder. Thus, as already indicated, the range of movement of selector valve 31 by thermostat B is slightly in excess of the corresponding ratio of movement of piston 30, in operating cylinder 29.

*Oil control valve*

The operating cylinder piston 30, and its shaft are actuated by the selector valve so as to respond directly in proportion to the temperature of the oil surrounding the thermostat B, and by this operation, the cooler shutter 19, is actuated accordingly. This operating cylinder is also connected so as to operate the two-way oil control valve A, and control or proportion the flow of oil through the oil cooler 16, by-pass 17, and its cooler warm-up jacket 18.

The construction of the two-way oil control valve A, is shown in the upper part of Figure 5, and the operating interconnection between this valve and the shaft 48, from piston 30, of operating cylinder 29, is best illustrated in the simplified diagrammatic views, Figures 11 and 12. As constructed these interconnecting operating elements are shown in Figures 2, 4, 8 and 9.

As previously stated, oil from the scavenge pump is introduced through the return conduit into inlet port 23, to the two-way control valve A, and leaves this valve through ports 25, and 26, through the base of housing 20, these ports respectively communicating directly with aligned chambers 33, 34, and 35, of the control valve. Outlet port 25, is adapted to communicate with the oil cooler and port 26, with the warmup jacket of the cooler providing a by-pass for the oil.

In control valve A, the inlet chamber 33 is separated from the outlet chambers 34, and 35, by partitions 73, and 74, respectively each of which has ports 75, and 76, affording communication between the inlet chamber 33, and respective outlet chambers 34, and 35. A rotary shaft 77, extends axially into these chambers and through a stuffing box 78, formed on end plate 21, and this shaft is journaled in the partitions 73, and 74, centrally of the ports 75, and 76, which surround this shaft and are conveniently arranged in line with each other and at 90° angles around the shaft axis.

On shaft 77 is rigidly mounted a rotary disk valve 79, which is also provided with ports 80, similar to ports 75, in partition 73, so that when shaft 77 is rotated approximately 45°, the ports 75, in partition 73, become uncovered by the disk-valve 79 when the ports 80, are aligned with ports 75, to provide a maximum free passageway for oil flow therethrough into outlet chamber 34, and port 25, to the oil cooler.

Similarly a disc valve 81, is mounted on shaft 77, so that this valve 81, can slide to the left on shaft 77, and be rotated by it, a pin 82 and longitudinal slot 83 in its sleeve 81a, affording a suitable connection for this purpose. This valve has ports 84, like ports 76, in partition 74 such that when valve 81 is rotated approximately 45°, the ports 76, in partition 74, are closed by the disc valve 81. The angular relationship of the left hand combination of disc 81, and partition 74, and the right hand combination of disc 79. and partition 73 is such that in one extreme position the disk 79 closes the ports 75, in partition 73, and the ports 76, in partition 74, are in open alignment with ports 84, in disc valve 81, thus permitting oil flow to the left, to the by-pass and warm-up jacket of the cooler; and for the other extreme position the left hand ports are closed and the right hand ports are open, permitting flow therethrough to the cooler. For intermediate positions of rotation of shaft 77, the flow is split.

A spring 85, has one end pressing valve 81, against partition 74, and the other end is anchored to shaft 77, by means of a collar 88, secured thereto so that it tends to push shaft 77, to the left, holding disc valve 79, against partition 73. The strength of spring 85, is governed by conditions of overload pressure due to a congealed cooler, as will be set forth hereinafter.

A lever arm 86, is secured to the outer end of shaft 77, and according to the diagrammatic illustrations in Figure 11, it engages the end of operating piston shaft 48, so that when the oil is cold and the operating cylinder piston 30, is at the right end of cylinder 29, a spring 87 operating to maintain lever arm 86, in engagement with shaft 48, the disk valves are in such a position so that all the oil is passed through ports 76, and 84, of partition 74, and disk valve 81, to chamber 35, outlet 26, to the by-pass and warm-up jacket (as shown in Figure 5).

When the oil is hot, piston 30, is at the left end of operating cylinder 29, and shaft 77, is rotated to its other extreme position (as shown in Figure 12), by shaft 48, of operating cylinder piston 30. The disk valves on shaft 77, are thus rotated so that all the oil travels to the right, through chamber 34 and thence to the oil cooler. At intermediate temperatures, piston 30, is at intermediate positions in operating cylinder 29, and shaft 77, is turned to intermediate positions so as to proportion the flow of oil through both the cooler and the warm-up jacket or by-pass.

Since under normal conditions the control cylinder piston 30, operating shutter 19, is always in step with thermostat B, and the two-way control valve disks are also turned in step with this piston 30, the oil flow is directed through the by-pass and warm-up jacket when the oil is cold, and through the oil cooler when the oil is hot (except in case of a congealed cooler).

For simplicity the diagrams, Figures 11 and 12, disclose operating cylinder 29, and the axis of the two-way control valve at right angles with respect to each other. However, in the construction as disclosed in Figures 5 and 6, these parts are parallel with each other, and it is therefore essential to convert the lineal movements of shaft 48 in a manner to rotate shaft 77. The driving connections for this purpose as shown in Figures 2, 4, 8 and 9 will now be described.

According to the construction illustrated, the outer end of rotary shaft 77, of the two-way control valve A, has a collar 86a, rigidly secured thereto, lever arm 86, is integrally fastened to this collar and extends laterally therefrom so that the shaft can be rotated thereby.

The outer end of lever arm 86, is bifurcated to receive a projecting pin 89, on a lateral mounting extension 90, of a sliding link 91, having longitudinal slots therein for mounting it in a manner so that it can be reciprocated on a pivot shaft 92, and a guide pin 93; shaft 92 being supported in mounting extensions 94, and 95, formed on end plate 21, and guide pin 93, is supported on a similar extension 96.

Spring 87, referred to as operating to rotate shaft 77, and its disk valves, is connected at one end to a pin 97, in the end of extension 96; and its other end is connected to a projection 98, on the sliding link 91, thereby operating to move the link under its tension and rotate shaft 77, in one direction.

The movement of link 91, and angular position of shaft 77, is determined by a stop pin 99, carried by link 91, and its engagement with the outer operating surface 101, of a cam 100, which is journaled on pivot shaft 92. Opposite the operating surface 101, cam 100, has an arm 102, extending over a pin 103, projecting from a side of head 48a, on the end of piston shaft 48. An extension 104, on cam arm 102, provides a mounting for one end of a tension spring 105, which is secured at its other end to a lug 106, on the mounting extension 94, to maintain cam arm 102, in engagement with the piston head pin 103.

Figure 8:
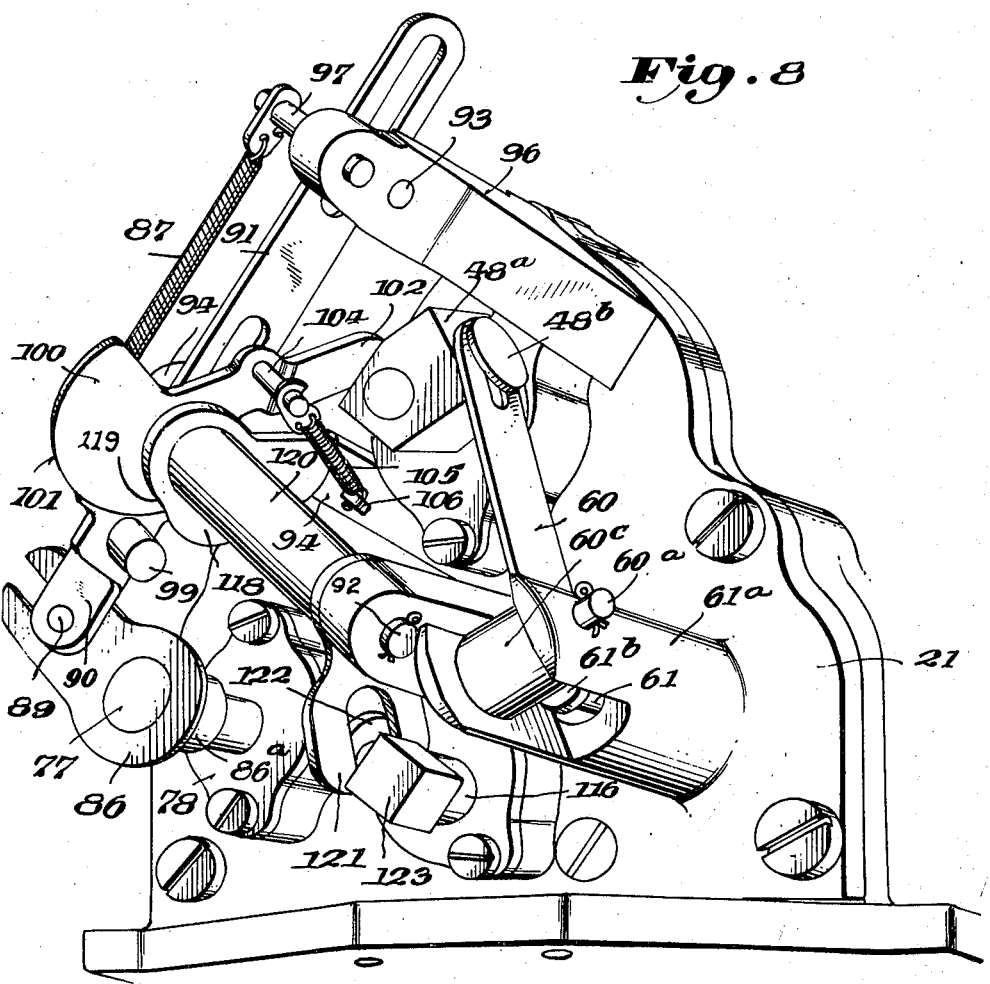
Figure 8 is an enlarged perspective view, looking upwardly at the left end, showing the several parts in the position they assume with the power piston in its extreme right hand position.
Figure 9:
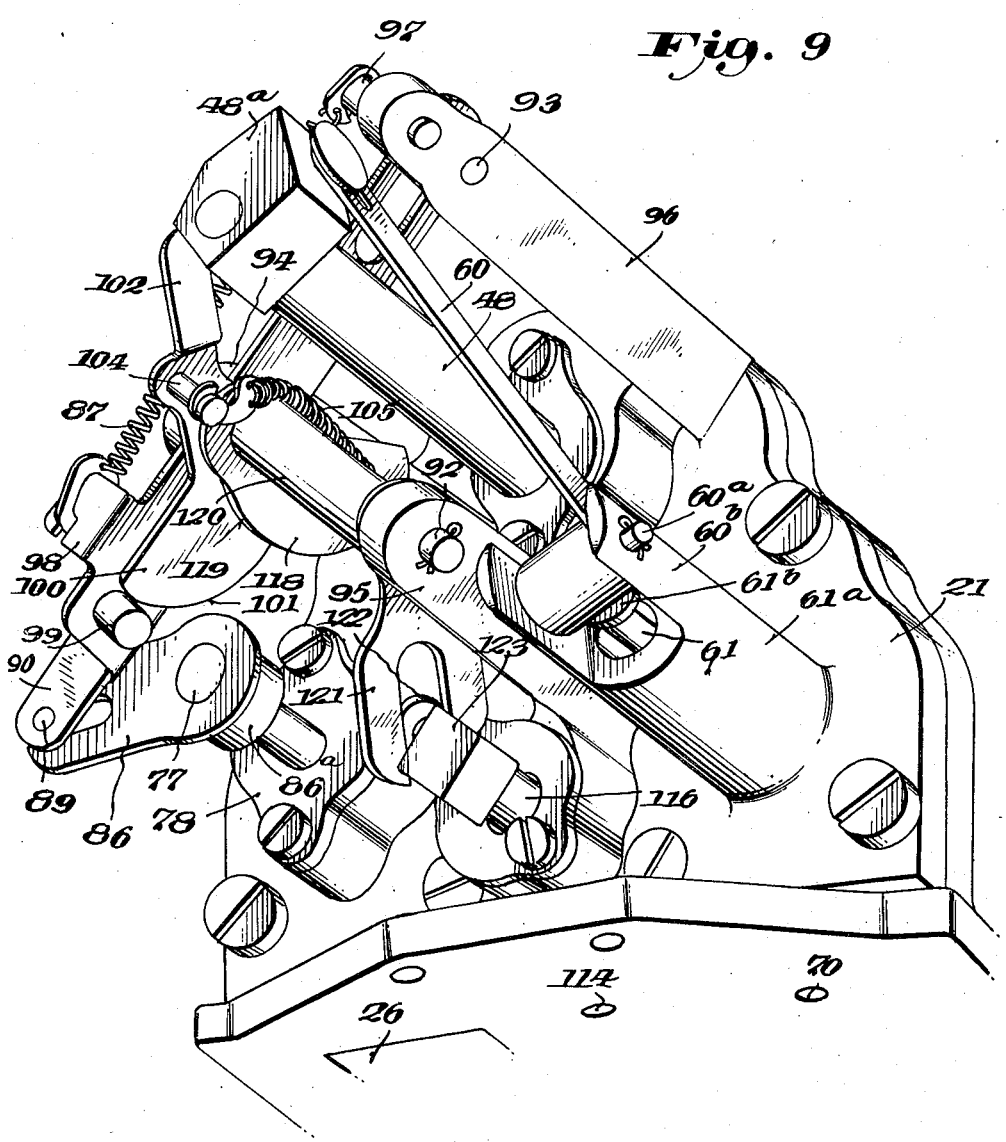
Figure 9 is an enlarged perspective view similar to Figure 8, but with the power piston in its extreme left hand position.

As best shown in Figure 8, the operating piston shaft 48, is in its extreme right position and cam operating surface 101 in its cooperating position and under the influence of spring 105, and shaft 77, is in its rotated position to provide a free passage of oil to the by-pass through the warm-up jacket of the cooler. Figure 9 illustrates operating shaft 48, in its outermost position, to the left, with the consequent movement of the cam operating surface 101, positioned so that shaft 77, is rotated to its other extreme position for passing all the oil through the oil cooler.

*Congealed cooler protection*

A condition which may arise, and for which a compensating provision must be made, is that of a congealed cooler. Since the cooler core is always full of oil, and since at times there is not sufficient circulation therethrough to maintain a normal working temperature, it is possible for this contained oil to cool off to a temperature below its pour point, and even to freeze solid.

The desirable compensation then is to:

1. Apply as high a pressure differential across the core as is practical, and
2. Stop all the air flow through the cooler until circulation is established.
3. Make this compensation (1) and (2) independent of the temperature of the thermostat.
4. When a proper flow has been established through the cooler, remove compensation, putting the control back to its normal responsiveness to the thermostat.

In carrying out these objections it is to be noted that since the pressure differential across the cooler core depends upon both quantity of oil flow and its temperature, there is a very considerable variation of pressure for normal operation. However, there is a maximum pressure which is not exceeded when conditions are normal. But for an abnormally low temperature of the oil in the cooler, a very high pressure is developed even for no flow.

In accordance with the diagrams, Figures 13 and 16, this high pressure may be utilized to operate the protective valve piston 38, in valve cylinder 36, communicating by a port 110 with the fluid entering chamber 34, just ahead of the cooler. Valve cylinder 36, has a down stream vent port 111, in its opposite end, and under normal pressure operating conditions therein, valve piston 38, covers a port 112. Valve piston 38, opens moving to the left against the pressure of a spring 113, when the pressure reaches a predetermined high value (considerably above any normal pressure to be expected), and when this valve opens, it permits high pressure oil to flow into the chamber 72 (diagram Figure 10) through port 107. Since the only other outlet from this chamber 72, is orifice 71, a pressure difference is created between the right and left sides of cap 64, of piston 63. If this pressure difference times the effective piston area, exceeds the strength of the spring 65, piston 63 will move to the left. This arrangement is such that if this motion continues groove 68, will register with port 56, and port 65 will be closed. Hence, as has been shown, the pressure to the right of shutter or control cylinder piston 30, becomes less than the pressure to the left and piston 30, moves clear to the right. This results in a completely closed shutter as long as the cooler pressure exceeds a predetermined amount.

When this protective relief valve is subjected to high pressure its piston 38, moves to the left, uncovering the ports 107, and 112. As stated, the oil from port 107, causes the shutter to close. The oil from port 112, is directed to the protective cylinder 37, and due to its high pressure forces the piston 39, therein and its shaft 116, to the extreme left, compressing a spring 117, surrounding shaft 116, and consequently shaft 116 operates on lever arm 86 to move and hold control valve A in its open position into the cooler. This position normally means that all the scavenged oil goes through the cooler, but since the cooler is blocked by congealed oil, the pressure is built up until disc valve 81 (Figures 5 and 12), is forced to the left against the force of spring 85 thereby providing a relief valve to permit the oil to flow through the by-pass and warm-up jacket of the cooler.

It is to be noted that cylinder 37, has a vent port 114, at its end beyond piston 39, and this piston has a vent orifice 115, which permits its return movement to the right when the high oil pressure is removed.

Hence by the above described protective mechanism, the compensation desired is accomplished as follows:

1. The high pressure across the cooler by the disc relief spring 85, in oil control valve A.
2. The shutter is closed by the high pressure moving the center selector valve piston 63 to the extreme left.
3. The thermostat B is not in contact with the selector valve during this period.
4. When the cooler pressure decreases to the point where the piston 38, in the protective relief valve covers the ports 107, and 112, then the center selector piston 63, moves back to the right until it again engages the thermostat push rod 43, and the protective cylinder piston 39, moves to the right allowing contact to be made between shutter piston rod 48 and control valve lever arm 86, thus restoring all parts to their normal position.

In the construction of this cooler protection mechanism, as shown in Figures 5, 6, 7, 14 and 15, it will be noted in general, that the arrangement is as shown and described in connection with the diagram, Figure 13. However, instead of having the port 107, in the protector relief valve cylinder 36, this port 107, in the casting, is arranged to provide communication between the congealed core protective cylinder 37, and chamber 72, of the selective valve and functions in a similar manner. In this arrangement, during normal operation, port 107, affords an outlet communication for chamber 72 (Figure 5), so that fluid may pass therefrom through port 107 (Figure 14), into cylinder 37 (Figure 6), back of piston 39, to vent port 114, noting also that vent port 111 of the protector relief valve cylinder 36 also communicates therewith through cylinder 39. These vent ports 111 to 114, bleed the oil from the various chambers to the down stream of the cooler along with oil from port 70, suitable conduit means (not shown) affording communication for these ports with the controller by-pass or outlet.

In this latter arrangement, under excessively high pressure conditions when piston 39, is moved to the left so as to pass port 107, instead of operating as an outlet for oil to flow from chamber 72, it is subject to the high pressure of the oil flowing into protective cylinder 37, from the protective relief valve cylinder 36, and operates on the center selector valve piston 63, as above described.

The practical construction of the operating connection between the protective cylinder piston shaft 116 and the two-way control valve A, is shown in Figures 2, 4, 8, and 9, and since reciprocating movements of this shaft, have to be translated to rotate the control valve shaft 77 the connecting elements are similar to the driving connection with the operating cylinder piston shaft 48 heretofore described. Part of the lever mechanism is the same, the outer lever arm 86 on rotary shaft 77 and its connection with the laterally sliding link 91. The stop pin 99 of this link is engaged by another cam 118, instead of cam 100, and this cam 118 which has an operating surface 119 similar to operating surface 101 of cam 100, but this operating surface 119, of cam 118, is operated by shaft 116, independent of the movements of cam 100.

Cam 118 with its operating surface 119 comprises a lever arm integrally connected with and extending from one end of a hollow shaft 120 also journaled on pivot shaft 92 between cam 100 and the mounting extension 95 of end plate 21. On the other end of hollow shaft 120 is an integrally connected lever arm 121 having bifurcated ends which engage opposite sides of a laterally extending stud 122, on a head 123 on the protective cylinder piston shaft 116. Thus reciprocating movements of shaft 116, are translated for effecting rotary movements of shaft 77, for completely opening the fluid passage through control valve A, into the cooler and closing the passage to the by-pass.

Both Figures 8 and 9 illustrate the two extreme positions of operation by the operating cylinder piston shaft 48, although the protective cylinder piston shaft 116, is shown only in the position for normal operation. Assuming the conditions exist as represented in Figure 9, the operating cylinder piston 30 and its shaft 48 are in the extreme left position (for hot oil), all of the oil is passed through the cooler. If the oil in the cooler is cooled, operating cylinder piston shaft 48 under the thermostatic control will, under normal conditions, move to the right, to the position shown in Figure 8 for normal cool oil, oil passing through the cooler by-pass warm-up jacket. However, should the oil in the cooler be suddenly chilled to a congealing or freezing point, then the protective relief valve C, comes into operation, its piston shaft 116, moves out to the left taking control of the selective operating valve 31 to effect the opening of control valve A, for passage of oil to the cooler and simultaneously closing the cooler shutter until the cooler has warmed up by the passage of hot oil from the engine through the spring loaded disk valve 81, and warm-up jacket, as set forth above.

It is to be understood that the form of the invention herein shown and described, is to be taken as but one example or illustrative thereof, and that various changes in shape, size and arrangement or combination of parts may be resorted to without departing from the spirit of the invention, as falls within the scope of the following claims.

What is claimed is:

1. Regulating apparatus for airplane engine lubrication systems and the like wherein scavenged oil is returned under pressure to an oil reservoir by way of an oil cooler and an oil cooler by-pass warm-up jacket, said cooler being disposed for the passage of air therethrough as a coolant, comprising means for controlling the passage of air through the cooler, an oil control valve for directing the passage of oil through the cooler and by-pass warm-up jacket, said valve acting selectively to deny access of the oil to the cooler or to deny access of the oil to the warm-up jacket or to permit a flow split between the cooler and jacket, power operating means receiving its power from the pressure on the scavenged oil for operating said air controlled means and oil control valve, and a thermostat for controlling the operation of both the said air controlling means and oil control valve through said power operating means in accordance with the temperature of the oil returned to the reservoir.

2. Regulating apparatus for airplane engine lubrication systems and the like wherein scavenged oil is returned under pressure to an oil reservoir by way of an oil cooler and an oil cooler by-pass warm-up jacket, said cooler being disposed for the passage of air therethrough as a coolant, comprising means for controlling the passage of air through the cooler, an oil control valve for directing the passage of oil through the cooler, and by-pass warm-up jacket, said valve acting selectively to deny access of the oil to the cooler or to deny access of the oil to the warm-up jacket or to permit a flow split between the cooler and jacket, a thermostat for controlling the operation of both the said air controlling means and oil control valve in accordance with the temperature of the oil returned to the reservoir, and means for responding to an excess pressure due to low temperatures in the cooler for taking the control from the thermostat so as to operate the air controlling means to shut off the passage of air through the cooler and to operate the control valve in a manner to apply pressure on the cooler and by-pass oil through the warm-up jacket until the normal pressures and temperatures in the cooler again prevail.

3. Regulating apparatus for airplane engine lubrication systems and the like wherein scavenged oil is returned under pressure to an oil reservoir by way of an oil cooler and an oil cooler by-pass warm-up jacket, said cooler being disposed for the passage of air therethrough as a coolant, comprising means for controlling the passage of air through the cooler, an oil control valve for directing the passage of oil through the cooler and by-pass warm-up jacket, said valve acting selectively to deny access of the oil to the cooler or to deny access of the oil to the warm-up jacket or to permit a flow split between the cooler and jacket, an operating cylinder with a piston therein for operating both the said air control means and oil control valve, means for applying fluid pressures to opposite sides of the piston in said cylinder, a longitudinal movable selector valve for controlling the fluid pressures in said operating cylinder on the opposite sides of the piston therein so as to move said operating cylinder piston in accordance with the longitudinal positions of selector valve, and a thermostat for moving the selector valve and thus control the operation of the operating cylinder piston.

4. Regulating apparatus for airplane engine lubrication systems and the like wherein scavenged oil is returned under pressure to an oil reservoir by way of an oil cooler and an oil cooler by-pass warm-up jacket, said cooler being disposed for the passage of air therethrough as a coolant, comprising means for controlling the passage of air through the cooler, an oil control valve for directing the passage of oil through the cooler and by-pass warm-up jacket, said valve acting selectively to deny access of the oil to the cooler or to deny access of the oil to the warm-up jacket or to permit a flow split between the cooler and jacket, an operating cylinder and a piston therein for operating both the said air control means and oil control valve, means for applying fluid pressures to opposite sides of the piston in said cylinder, a longitudinal movable selector valve for controlling the fluid pressures in said operating cylinder on the opposite side of the piston therein so as to move said operating cylinder piston in accordance with the longitudinal positions of selector valve, a thermostat for moving the selector valve and thus control the operation of the operating cylinder piston, and means responsive to an excess of pressure due to low temperature in the cooler for taking the control from the thermostat and operating on said selector valve to cause the operating cylinder piston to move so as to shut off the passage of air through the cooler, applying oil pressure on the cooler and by-pass oil through the warm-up jacket until normal pressure and temperatures in the cooler again prevail.

5. A fluid pressure operated control system comprising a fluid cylinder, means for introducing fluid pressure into opposite ends of said cylinder, a power operating piston thereon having its stroke operations responding to the fluid pressure in the cylinder on opposite sides of the piston, means for controlling the fluid outflow from opposite ends of the cylinder to vary the pressures on opposite ends of the power operating piston, said controlling means comprising a longitudinally movable selector valve composed of two cooperating elements, a connection between one of said selector valve elements and the operating cylinder piston whereby said element and the piston are proportionately moved with respect to each other, means for moving the second element in response to conditions to be controlled in the control system, said selector valve element having interacting fluid passageways comprising longitudinally spaced ports in the first element in constant communication with opposite ends of the fluid operating cylinder and corresponding ports in the second element so spaced that when said second element is moved with respect to the first element ports of the two elements will be aligned for effecting an outlet passageway for fluid from one end or the other of the fluid cylinder to effect a movement of the operating piston in accordance with the movement of said second element, and a port in said second element so positioned that when this element is moved to bring this port into alignment with a port of the first element the outlet fluid passage provided thereby will be such as to effect a movement of the operating piston reversed with respect to the motion initiating movement of the said second selector element.

6. A fluid pressure operated control system, comprising first and second cylinders, a piston in said first cylinder movable in response to pressure variations on the opposite sides thereof, pressure fluid passages communicating the opposite ends of said first cylinder with said second cylinder, a valve bushing in said second cylinder, separate sets of radial ports in said bushing communicating with respective pressure fluid passages, a piston valve reciprocable in said bushing to control the flow of fluid through the ports thereof, said valve having inward and outward motions within said bushing and adapted at a predetermined point in its travel in each direction to initiate a fluid pressure operation of said piston, said piston moving in a first direction in response to inward motion of the valve and moving in a second direction in response to outward motion of the valve, and means responsive to an overtravel of said valve in an inward direction beyond said predetermined point for initiating movement of said piston in said second direction.

7. A fluid pressure operated control system, comprising a cylinder, a piston reciprocable in said cylinder, means for admitting pressure fluid in said cylinder on opposite sides of said piston whereby said piston normally is held against movement by balanced opposing pressures, a pressure fluid outlet from said cylinder on each side of said piston, means for controlling the flow of fluid from said outlets including a pair of piston type valves arranged in telescoping relation, separate sets of radial ports in the outer of said piston valves communicating with respective cylinder outlets, two sets of radial ports in the inner of said piston valves so arranged that relative motion of said inner valve in a first direction brings a first one of the sets of ports therein into alignment with a first one of the sets of ports in said outer valve while relative motion of said inner piston in a second direction brings the second of the sets of ports therein into alignment with the second of the sets of ports in said outer valve, whereby to permit the escape of pressure fluid from a selective end of said cylinder and initiate movement of said piston in a selected direction, linkage connecting said piston to the outer of said piston valves and operable after a predetermined extent of movement of said piston to move said outer valve to interrupt the escape of fluid from said cylinder and halt the motion of said piston, and a third set of ports in said inner valve positioned to be brought by an overtravel of said inner valve in said first direction into alignment with the second of the sets of ports in said outer valve.

8. Regulating apparatus for airplane engine lubrication systems and the like wherein scavenged oil is returned to an oil reservoir by way of an oil cooler, said cooler being disposed for the passage of air therethrough as a coolant, comprising means for controlling the passage of air through the cooler, a power piston movable in response to fluid pressure variations on the opposite sides thereof for variably adjusting said air controlling means, means for controlling fluid pressure variations on the opposite sides of said piston including first and second relatively movable pressure fluid flow control valves, first and second sets of mating ports in each of said valves, a relative motion of said first valve in a first direction bringing a first one of the sets of ports therein into alignment with the mating set of ports in said second valve and relative motion of said first valve in a second direction bringing the second of the sets of ports therein into alignment with the mating set of ports in said second valve, a third set of ports in said first valve positioned to be brought by an overtravel of said first valve in said first direction into alignment with the second set of ports of said second valve, a thermostat interposed in the path of the oil returned from the cooler to the reservoir for moving said first valve in said first and second directions, and means responsive to an increased pressure drop across the cooler as may be caused by congelation therein for effecting overtravel of said first valve in said first direction.

9. Regulating apparatus for airplane engine lubrication systems and the like wherein scavenged oil is returned to an oil reservoir by way of an oil cooler, said cooler being disposed for the passage of air therethrough as a coolant and having primary and secondary oil flow passages therethrough, said secondary passage serving as a by-pass with respect to said primary passage, a valve stationed at the entrance to said primary and said secondary passages and settable to direct the oil selectively through said primary and secondary passages and settable to intermediate positions wherein the flow may be divided between said passages, air flow controlling means for regulating the rate of air flow through the cooler, reversible motor means, means responsive to a changed condition of the oil indicating the oil viscosity for causing said motor means to move in a first direction as the viscosity of the oil rises and to move in a second direction as the viscosity of the oil descends, an operating connection between said motor means and said air flow controlling means whereby said controlling means moves to increase the rate of air flow as the oil viscosity increases and to reduce the rate of air flow as the oil viscosity decreases, and an operating connection between said motor means and said valve for moving said valve toward open position with respect to said primary passage and toward closed position with respect to said secondary passage as said motor means moves in said first direction and for moving said valve toward closed position with respect to said primary passage and toward open position with respect to said secondary passage as said motor means moves in said second direction.

10. Regulating apparatus according to claim 9, characterized by means movable in response to a rise in pressure drop across said primary passage above a predetermined value for causing said motor means to move said air flow controlling means in a direction to reduce the rate of air flow through the oil cooler and for moving said valve independently of said motor means toward open position with respect to said primary passage and toward closed position with respect to said secondary passage.

11. Regulating apparatus according to claim 9, characterized by means movable in response to a rise in pressure drop across said primary passage above a predetermined value for moving said valve independently of said motor means toward open position with respect to said primary passage and toward closed position with respect to said secondary passage.

12. Regulating apparatus for airplane engine lubrication systems and the like wherein scavenged oil is returned under pressure to an oil reservoir by way of an oil cooler, said cooler being disposed for the passage of air therethrough as a coolant and having primary and secondary oil flow passages therethrough, comprising means for controlling the passage of air through the cooler, an oil control valve for directing the passage of oil through the primary and secondary passages, said valve acting selectively to deny access of the oil to the primary passage or to deny access of the oil to the secondary passage or to permit a flow split between said passages, power operating means receiving its power from the pressure on the scavanged oil for operating said air controlling means and oil control valve, a thermostat for controlling the operation of both the said air controlling means and oil control valve through said power operating means in accordance with the temperature of the oil returned to the reservoir, and means movable in response to a rise in pressure drop across said primary passage above a predetermined value for moving said oil control valve independently of said power operating means toward open position with respect to said primary passage and toward closed position with respect to said secondary passage.

HARRY T. BOOTH.

REFERENCES CITED

The following references are of record in the file of this patent:

UNITED STATES PATENTS

| Number | Name | Date |
|---|---|---|
| 2,244,641 | Fedders | June 3, 1941 |
| 2,275,576 | Ware | Mar. 10, 1942 |
| 1,849,008 | Hutchinson | Mar. 8, 1932 |
| 2,288,877 | Andersen | July 7, 1942 |
| 2,256,970 | Bryant | Sept. 23, 1941 |
| 2,283,541 | Dodson | May 19, 1942 |
| 1,004,541 | Martin | Sept. 26, 1911 |
| 1,353,114 | Edwards | Sept. 14, 1920 |
| 2,297,213 | Gosslau | Sept. 29, 1942 |
| 959,417 | Anderson | May 24, 1910 |
| 2,020,847 | Mitereff | Nov. 12, 1935 |
| 1,319,463 | Doble | Oct. 21, 1919 |
| 2,018,977 | Spellman | Oct. 29, 1935 |
| 1,228,765 | Fekete | June 5, 1917 |
| 1,318,069 | Giesler | Oct. 7, 1919 |
| 2,279,285 | Worth | Apr. 7, 1942 |
| 2,288,599 | Ramsaur | July 7, 1942 |
| 2,291,607 | Chausson | Aug. 4, 1942 |
| 2,301,665 | Dykeman | Nov. 10, 1942 |
| 2,314,937 | Hannon | Mar. 30, 1943 |
| 2,322,047 | Mormile | June 15, 1943 |
| 1,902,970 | Ramsaur | Mar. 28, 1933 |
| 1,913,680 | McCray | June 13, 1933 |
| 1,961,343 | Donaldson | June 5, 1934 |
| 2,107,188 | Ryder | Feb. 1, 1938 |
| 2,134,778 | Clarke | Nov. 1, 1938 |
| 2,348,212 | Gill | May 9, 1944 |

FOREIGN PATENTS

| Number | Country | Date |
|---|---|---|
| 316,715 | Germany | Nov. 24, 1919 |
| 19,484 | Switzerland | Feb. 26, 1900 |
| 149,105 | Great Britain | Aug. 12, 1920 |
| 232,309 | Great Britain | Apr. 14, 1925 |
| 463,313 | Great Britain | Mar. 19, 1937 |
| 377,072 | Italy | Dec. 7, 1939 |
| 621,750 | France | Feb. 12, 1927 |